US011213982B2

(12) United States Patent
Tanaka (10) Patent No.: US 11,213,982 B2
(45) Date of Patent: Jan. 4, 2022

(54) INJECTION APPARATUS

(71) Applicant: NISSEI PLASTIC INDUSTRIAL CO., LTD., Nagano-ken (JP)

(72) Inventor: Kazunori Tanaka, Nagano-ken (JP)

(73) Assignee: NISSEI PLASTIC INDUSTRIAL CO., LTD.

( * ) Notice: Subject to any disclaimer, the term of this patent is extended or adjusted under 35 U.S.C. 154(b) by 0 days.

(21) Appl. No.: 16/833,155

(22) Filed: Mar. 27, 2020

(65) Prior Publication Data

US 2020/0324447 A1 Oct. 15, 2020

(30) Foreign Application Priority Data

Apr. 15, 2019 (JP) .............................. JP2019-076804

(51) Int. Cl.
*B29C 45/18* (2006.01)
*B29C 45/74* (2006.01)

(52) U.S. Cl.
CPC .............. *B29C 45/18* (2013.01); *B29C 45/74* (2013.01)

(58) Field of Classification Search
CPC ..... B29C 45/18; B29C 45/74; B29C 45/6707; B29C 45/67; B29C 45/6764; B29C 45/68; B29C 45/70; B29C 2045/703; B29C 45/706; B29C 2045/1778;

(Continued)

(56) References Cited

U.S. PATENT DOCUMENTS 4,304,540 A * 12/1981 Hammon ................ B30B 1/323
425/150
4,865,534 A * 9/1989 Hehl .................... B29C 45/1773
425/547

(Continued)

FOREIGN PATENT DOCUMENTS

DE 19580020 5/1995
DE 19531329 8/1995

(Continued)

OTHER PUBLICATIONS

English-language machine translation of Japanese Publication No. 06134808, Publication Date May 17, 1994.

(Continued)

*Primary Examiner* — Xiao S Zhao
*Assistant Examiner* — Emmanuel S Luk
(74) *Attorney, Agent, or Firm* — Adams & Wilks (57) ABSTRACT

An injection apparatus includes a heating cylinder having a nozzle for injecting resin material, a drop-port block that supports the heating cylinder, an injection stage extending so as to be orthogonal to the lengthwise axis of the heating cylinder while supporting the drop-port block, and a pair of injection-apparatus moving mechanisms that moves the heating cylinder. The drop-port block is provided with a supporting stage extending in the direction orthogonal to the lengthwise axis, and the injection-apparatus moving mechanism is connected to the supporting stage and to a stationary mount which supports a stationary mold. The supporting plate extends alongside the injection stage with a clearance therebetween so that deformation of the supporting stage when the nozzle is pressed into contact with the stationary mold is not transmitted to the injection stage.

15 Claims, 10 Drawing Sheets

(58) Field of Classification Search
CPC ........ B29C 2045/1779; B29C 45/1773; B29C 45/1777; B29C 45/6771
See application file for complete search history.

(56) References Cited

U.S. PATENT DOCUMENTS

| | | | | |
|---|---|---|---|---|
| 5,007,816 | A * | 4/1991 | Hehl | B29C 45/1773 264/328.11 |
| 5,348,464 | A * | 9/1994 | Rogers | B29C 45/07 425/190 |
| 5,855,829 | A * | 1/1999 | Siegrist | B29C 45/07 264/40.1 |
| 5,914,139 | A * | 6/1999 | Matsubayashi | B29C 45/5008 425/145 |
| 6,210,144 | B1 * | 4/2001 | Mailliet | B29C 45/6707 425/150 |
| 6,354,829 | B1 * | 3/2002 | Koide | B29C 45/1761 425/557 |
| 7,131,835 | B2 * | 11/2006 | Okazaki | B29C 45/1777 425/570 |
| 7,270,525 | B2 | 9/2007 | Nagaya et al. | 425/149 |
| 7,314,369 | B2 * | 1/2008 | Nishino | B29C 45/1777 425/567 |
| 10,543,632 | B2 * | 1/2020 | Sugahara | B29C 45/1744 |
| 2005/0008731 | A1 * | 1/2005 | Okazaki | B29C 45/1777 425/574 |
| 2005/0084556 | A1 * | 4/2005 | Yoshioka | B29C 45/1777 425/149 |
| 2006/0127528 | A1 * | 6/2006 | Schmidt | B29C 45/1761 425/574 |
| 2008/0088048 | A1 * | 4/2008 | Hayakawa | B29C 45/82 264/40.5 |
| 2014/0161925 | A1 * | 6/2014 | Yoshioka | B29C 45/18 425/569 |
| 2016/0158980 | A1 * | 6/2016 | Fitzpatrick | B29C 45/23 264/328.15 |
| 2017/0291342 | A1 * | 10/2017 | Dirneder | B29C 45/74 |
| 2019/0275718 | A1 * | 9/2019 | Eppich | B29C 45/1744 |

FOREIGN PATENT DOCUMENTS

| | | |
|---|---|---|
| DE | 10242289 | 4/2006 |
| EP | 1364765 | 11/2003 |
| JP | 2004209783 | 7/2004 |
| JP | 2014028491 | 2/2014 |

OTHER PUBLICATIONS

English-language translation of Notice of Reasons for Refusal dated Mar. 9, 2021.

* cited by examiner

INJECTION APPARATUS

FIELD OF THE INVENTION

The present disclosure relates to an injection apparatus installed so as to correspond to a mold clamping apparatus.

BACKGROUND OF THE INVENTION

An injection molding apparatus includes primary components that are a mold clamping apparatus and an injection apparatus. Moreover, the injection apparatus includes a primary component that is a heating cylinder. The heating cylinder is moved by an injection-apparatus moving mechanism, thus having a nozzle in contact with a metal mold. Subsequently, a resin material is injected from the heating cylinder into the metal mold.

An example conventionally-known injection apparatus that includes a primary component which is a heating cylinder is disclosed in, for example, JP H6-134808 A.

A technology disclosed in JP H6-134808 A will be described with reference to FIGS. 10A and 10B.

Figure 10A:
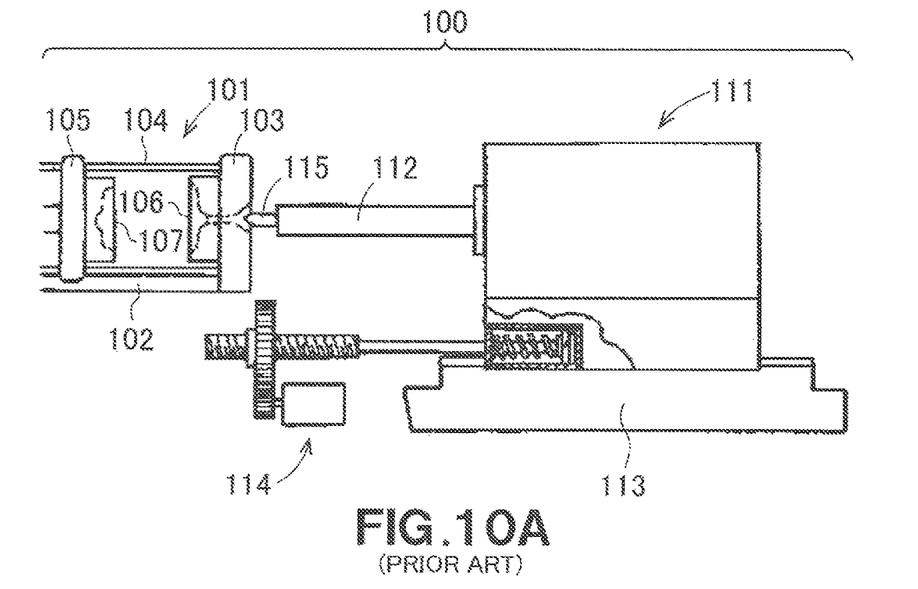
FIG. 10A is a diagram for describing a conventional injection apparatus.
Figure 10B:
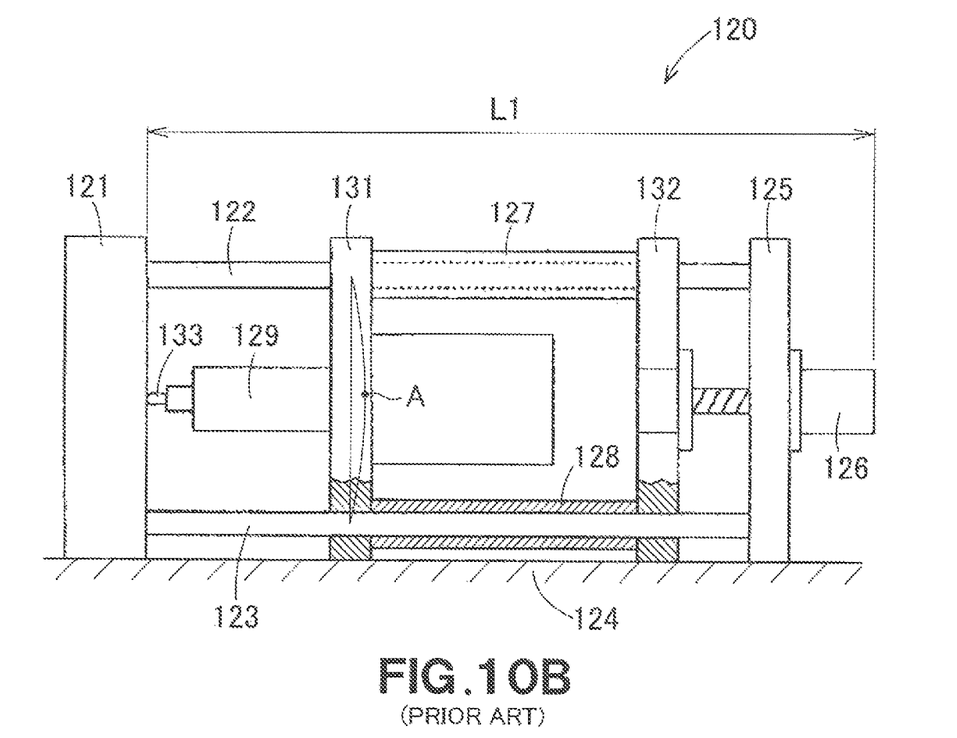
FIG. 10B is a diagram for describing an improved conventional injection apparatus.

FIGS. 10A and 10B are diagrams for describing a basic structure of the conventional technology.

As illustrated in FIG. 10A, an injection molding apparatus 100 includes primary components that are a mold clamping apparatus 101 and an injection apparatus 111.

The mold clamping apparatus 101 includes a stationary mount 103 fixed to a base 102, a tie bar 104 extended from the stationary mount 103, and a movable mount 105 guided by the tie bar 104. A stationary mold 106 is attached to the stationary mount 103, and a movable mold 107 is attached to the movable mount 105.

The injection apparatus 111 includes a primary component that is a heating cylinder 112, and is placed on a table 113 so as to be freely movable. The heating cylinder 112, etc., is moved by an injection-apparatus moving mechanism 114, thus having a tip of a nozzle 115 of the heating cylinder 112 touching the stationary mold 106 (or the stationary mount 103).

According to the structure illustrated in FIG. 10A, the stationary mount 103 has only the lower end fixed to the base 102. The stationary mount 103 is a cantilever which has only the lower end fixed, and which extends upwardly. The cantilever has the maximum deflection at a tip (an upper end).

Hence, when depressed by the nozzle 115, the stationary mount 103 falls down to the left side in the drawing.

FIG. 10B illustrates an injection apparatus 120 that employs a structure capable of addressing this fall-down.

As illustrated in FIG. 10B, the improved injection apparatus 120 includes an upper rod 122 and a lower rod 123 which are extended from a stationary mount 121, an injection actuating stage 125 which is connected to the respective tips of the rods 122 and 123 and which is fixed to a table 124, an injection actuating member 126 attached to the injection actuating stage 125, an upper sleeve 127 and a lower sleeve 128 which are attached to the rods 122 and 123, respectively, so as to be movable and to surround the rods 122 and 123, respectively, a first injection stage 131 which is fixed to the respective one ends of the sleeves 127 and 128, and which supports a heating cylinder 129, and a second injection stage 132 which is fixed to the respective other ends of the sleeves 127 and 128, and which is actuated by the injection actuating member 126.

The injection actuating member 126 collectively moves the second injection stage 132, the sleeves 127 and 128, and the first injection stage 131. This movement causes the tip of a nozzle 133 of the heating cylinder 129 to touch the stationary mount 121 (or the stationary mold).

A horizontal displacement of the stationary mount 121 is suppressed by the upper rod 122 and the lower rod 123, and thus a fall-down is suppressed.

However, there are still technical problems to be described below in the improved injection apparatus 120.

First, reaction force by nozzle touch causes the first injection stage 131 to be deflected like a line A. The greater the reaction force by the nozzle touch is, the larger the deflection becomes. When the degree of deflection becomes large, the movement of the upper sleeve 127 relative to the upper rod 122 is restricted, and the movement of the lower sleeve 128 relative to the lower rod 123 is also restricted.

Hence, a structure that suppresses a deflection of the first injection stage 131 is desired.

Moreover, because the injection actuating stage 125 and the injection actuating member 126 are arranged at the external side of the second injection stage 132, an overall length L1 of the injection apparatus 120 increases.

Although downsizing of the injection molding apparatus 120 is required, an injection apparatus with a short overall length is desired.

SUMMARY OF THE DISCLOSURE

An objective of the present disclosure is to provide an injection apparatus which can prevent an injection stage from being deflected and which has a short overall length.

An injection apparatus according to a first embodiment of the present disclosure is installed so as to correspond to a mold clamping apparatus.

The mold clamping apparatus includes a stationary mount, and a stationary mold is attached to the stationary mount.

The injection apparatus includes:

a heating cylinder;

a screw retained in the heating cylinder so as to be freely rotatable and movable in an axial direction;

a drop-port block supporting the heating cylinder;

an injection stage which extends so as to be orthogonal to a lengthwise axis of the heating cylinder while supporting the drop-port block;

a nozzle which is provided at a tip of the heating cylinder, and which injects a resin material;

and a pair of injection-apparatus moving mechanisms that moves the heating cylinder so as to cause the nozzle to touch the stationary mold.

The drop-port block is provided with a material drop-port which is provided at a base portion of the heating cylinder, and which guides the dropping resin material into the heating cylinder.

A supporting stage extended in a direction orthogonal to the lengthwise direction is provided on the drop-port block.

The injection-apparatus moving mechanisms are connected to the supporting stage and to the stationary mount.

According to the present disclosure, the supporting stage is attached to the drop-port block, and the injection-apparatus moving mechanism is attached to the supporting stage.

If the injection stage and the stationary mount are connected by the injection-apparatus moving mechanism, because of reaction force of a nozzle touch, the injection stage will be deflected.

According to the present disclosure, the injection-apparatus moving mechanism is attached to the supporting stage that is a different component from the injection stage, and the supporting stage and the stationary mount are connected by the injection-apparatus moving mechanism.

Although the supporting stage is deflected by the reaction force of the nozzle touch, the injection stage which is a different component is not deflected.

Moreover, the injection-apparatus moving mechanism is attached to the supporting stage located near the center of the injection apparatus. Hence, the injection-apparatus moving mechanism does not protrude remarkably from the injection apparatus. Consequently, the overall length of the injection apparatus can be reduced.

Hence, according to the present disclosure, an injection apparatus which can prevent an injection stage from being deflected and which has a short overall length can be provided.

Preferably, the supporting stage may be a rectangular cylindrical object; and the rectangular cylindrical object includes: a seat to be in contact with the drop-port block; and an upper wall, a lower wall, a front wall, and a back wall which are extended in the direction orthogonal to the lengthwise axis from the seat.

Since the supporting stage is a hollow body, weight saving can be accomplished in comparison with a solid body.

Preferably, the supporting stage may further include a reinforcement middle wall which is in parallel with the upper wall, and which connects the front wall and the back wall.

The reinforcement middle wall can enhance the rigidity in the direction in which external force acts.

Preferably, the injection-apparatus moving mechanism may include:

a hydraulic cylinder attached to the supporting stage;

a relay shaft connected to a piston rod of the hydraulic cylinder and extended toward the stationary mount;

a flanged bracket which is coupled to a tip of the relay shaft and which includes a flange that has a larger outer diameter than an outer diameter of the relay shaft; and a fixture bracket that fixes the flanged bracket to the stationary mount so as to be freely detachable.

By separating the fixture bracket from the stationary mount, the injection-apparatus moving mechanism can be separated from the stationary mount, enabling the heating cylinder to be rotated.

Preferably, the hydraulic cylinder may have a front portion fixed to the supporting stage, and have a remaining portion unfixed.

When bending force is applied to the piston rod, the hydraulic cylinder is inclined, and thus an adverse effect of bending is eased.

Preferably, the fixture bracket may be provided with a through-hole with a diameter which is larger than the outer diameter of the relay shaft, and which is smaller than the outer diameter of the flange, and is capable of moving to a nearby location to the supporting stage with the relay shaft being as a guide.

Since the fixture bracket that is a heavy component can be moved to the nearby location to the supporting stage before the injection apparatus is rotated, and the relay shaft can be utilized as a guide member at the time of this movement, the movement of the fixture bracket is facilitated.

An injection apparatus according to a second embodiment of the present disclosure is installed so as to correspond to a mold clamping apparatus.

The mold clamping apparatus includes a stationary mount, and a stationary mold is attached to the stationary mount.

The injection apparatus includes:

a heating cylinder;

a screw retained in the heating cylinder so as to be freely rotatable and movable in an axial direction;

an injection stage which extends so as to be orthogonal to a lengthwise axis of the heating cylinder while supporting the heating cylinder;

a nozzle which is provided at a tip of the heating cylinder, and which injects a resin material;

and a pair of injection-apparatus moving mechanisms that moves the heating cylinder so as to cause the nozzle to touch the stationary mold.

The injection stage includes:

a plurality of shafts extended in parallel with the lengthwise axis and in a direction becoming apart from the heating cylinder; and an injection actuating stage which is attached to respective tips of the shafts, and which is placed in parallel with the injection stage.

The injection stage further includes a pair of reinforcement frames which is placed in parallel with the lengthwise axis, and which connects the injection stage and the injection actuating stage.

An injection-apparatus moving mechanism is connected to the reinforcement frame and to the stationary mount.

Since the injection stage and the injection actuating stage are connected together by not only the plurality of shafts but also the pair of reinforcement frames, the bending rigidity of the injection stage is enhanced. Since the rigidity is high, the deflection of the injection stage is suppressed.

Moreover, since the injection-apparatus moving mechanism is placed along the reinforcement frame, the injection-apparatus moving mechanism does not protrude from the injection apparatus.

Hence, according to the present disclosure, an injection apparatus which can prevent an injection stage from being deflected and which has a short overall length is provided.

Preferably, the injection-apparatus moving mechanism may include a hydraulic cylinder that has a front portion and a rear portion fixed to the reinforcement frame.

Since the hydraulic cylinder has a role of reinforcing the reinforcement frame, the bending rigidity of the reinforcement frame increases.

An injection apparatus according to a third embodiment of the present disclosure is installed so as to correspond to a mold clamping apparatus.

The mold clamping apparatus includes a stationary mount, and a stationary mold is attached to the stationary mount.

The injection apparatus includes:

a heating cylinder;

a screw retained in the heating cylinder so as to be freely rotatable and movable in an axial direction;

an injection stage which extends so as to be orthogonal to a lengthwise axis of the heating cylinder while supporting the heating cylinder;

a nozzle which is provided at a tip of the heating cylinder, and which injects a resin material;

and a pair of injection-apparatus moving mechanisms that moves the heating cylinder so as to cause the nozzle to touch the stationary mold.

The injection stage includes:

a plurality of shafts extended in parallel with the lengthwise axis and in a direction becoming apart from the heating cylinder; and an injection actuating stage which is attached to respective tips of the shafts, and which is placed in parallel with the injection stage.

The pair of injection-apparatus moving mechanisms is connected to the injection stage and to the injection actuating stage.

The injection-apparatus moving mechanism also serves as the foregoing reinforcement frame. The reinforcement frame can be eliminated in this case while accomplishing the advantageous effect according to the foregoing structure.

Hence, according to the present disclosure, an injection apparatus which can prevent an injection stage from being deflected and which has a short overall length can be provided.

Preferably, the shaft may include: a shaft main-body portion; and small-diameter portions which are provided at both ends of the shaft main-body portion, respectively, and which have a smaller diameter than a diameter of the shaft main-body portion; and positioning of the injection actuating stage with reference to the injection stage is enabled by the shaft main-body portion by inserting the small-diameter portions in the injection stage and in the injection actuating stage, respectively.

By inserting the small-diameter portions in the injection stage and in the injection actuating stage, positioning of the injection actuating stage with reference to the injection stage is enabled by the shaft main-body portion. Moreover, when the reinforcement frame (or the injection-apparatus moving mechanism that also serves as the reinforcement frame) is connected to the injection stage and to the injection actuating stage, since the positioning of the injection actuating stage has been completed by the shaft, attachment of the reinforcement frame (or the injection-apparatus moving mechanism that also serves as the reinforcement frame) is facilitated.

BRIEF DESCRIPTION OF THE DRAWINGS

Several preferred embodiments of the present disclosure will be described below with reference to the accompanying drawings in which.

DETAILED DESCRIPTION OF THE PREFERRED EMBODIMENTS

First Embodiment

An injection apparatus according to a first embodiment will be described below with reference to FIG. 1 to FIGS. 6A to 6D. In the following description, an extending action of a hydraulic cylinder means to extend the overall length of the hydraulic cylinder, and a reducing action means to reduce the overall length of the hydraulic cylinder.

Figure 1:
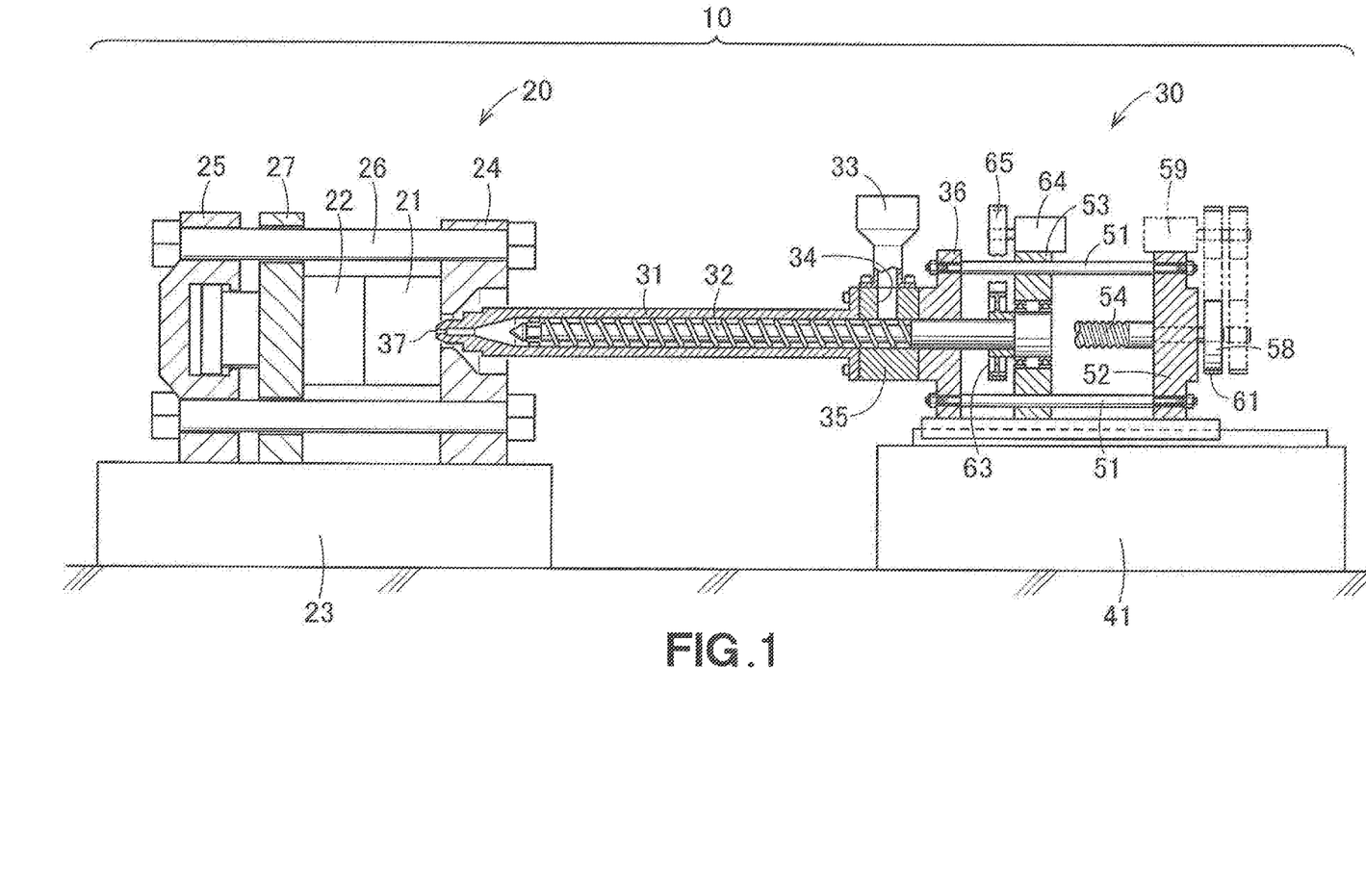
FIG. 1 is cross-sectional view of an injection molding apparatus that includes an injection apparatus according to a first embodiment of the present disclosure.

As illustrated in FIG. 1, an injection molding apparatus 10 includes primary components that are a mold clamping apparatus 20 and an injection apparatus 30.

The mold clamping apparatus 20 is to clamp metal molds that include a stationary mold 21 and a movable mold 22.

The mold clamping apparatus 20 includes a base 23, a stationary mount 24, a mold clamping mechanism 25 which are fixed to the base 23, tie bars 26 which are connected to the stationary mount 24 and to the mold clamping mechanism 25, and a movable mount 27 guided by the tie bars 26.

The stationary mold 21 is attached to the stationary mount 24, the movable mold 22 is attached to the movable mount 27, and the mold clamping mechanism 25 performs mold clamping.

Note that the mold clamping mechanisms 25 may be any one of a hydraulic cylinder, a toggle mechanism, and a motor-actuated cylinder.

The injection apparatus 30 is installed so as to correspond to such a mold clamping apparatus 20.

The injection apparatus 30 includes a heating cylinder 31, a screw 32 that is retained in the heating cylinder 31 so as to be freely rotatable and movable in the axial direction, a drop-port block 35 that supports the heating cylinder 31, an injection stage 36 that supports the drop-port block 35, and a nozzle 37 which is provided at the tip of the heating cylinder 31 and which injects a resin material.

The drop-port block 35 has a material drop-port 34 that guides, within the heating cylinder 31, the resin material dropped from a hopper 33 provided at the base portion of the heating cylinder 31.

Figure 2:
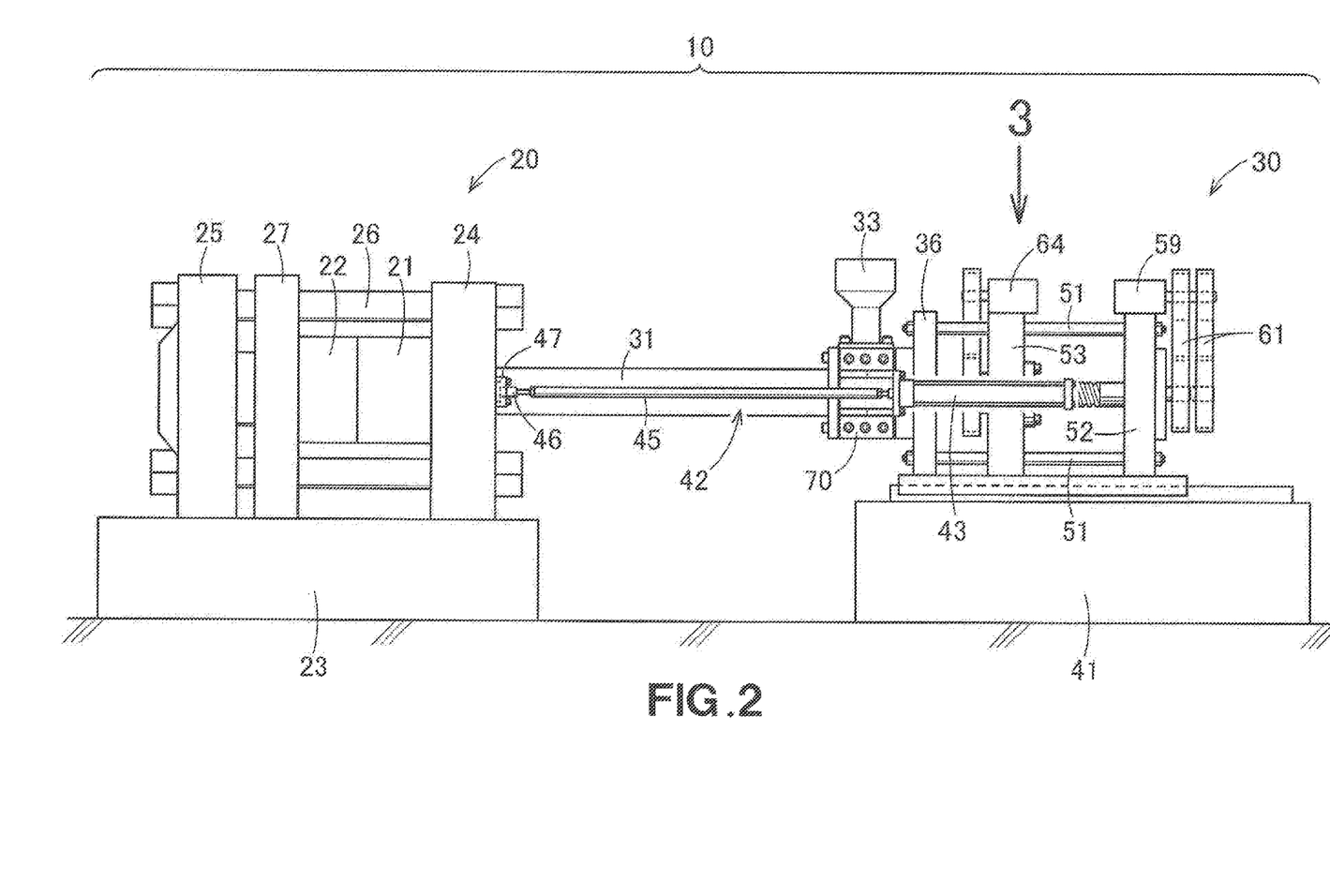
FIG. 2 is a side view of the injection molding apparatus that includes the injection apparatus according to the present disclosure.

As illustrated in FIG. 2, the injection apparatus 30 is placed on a table 41, comes close to the mold clamping apparatus 20 by a reducing action of the injection-apparatus moving mechanisms 42, and moves apart from the mold clamping apparatus 20 by an extending action of the injection-apparatus moving mechanisms 42.

Figure 3:
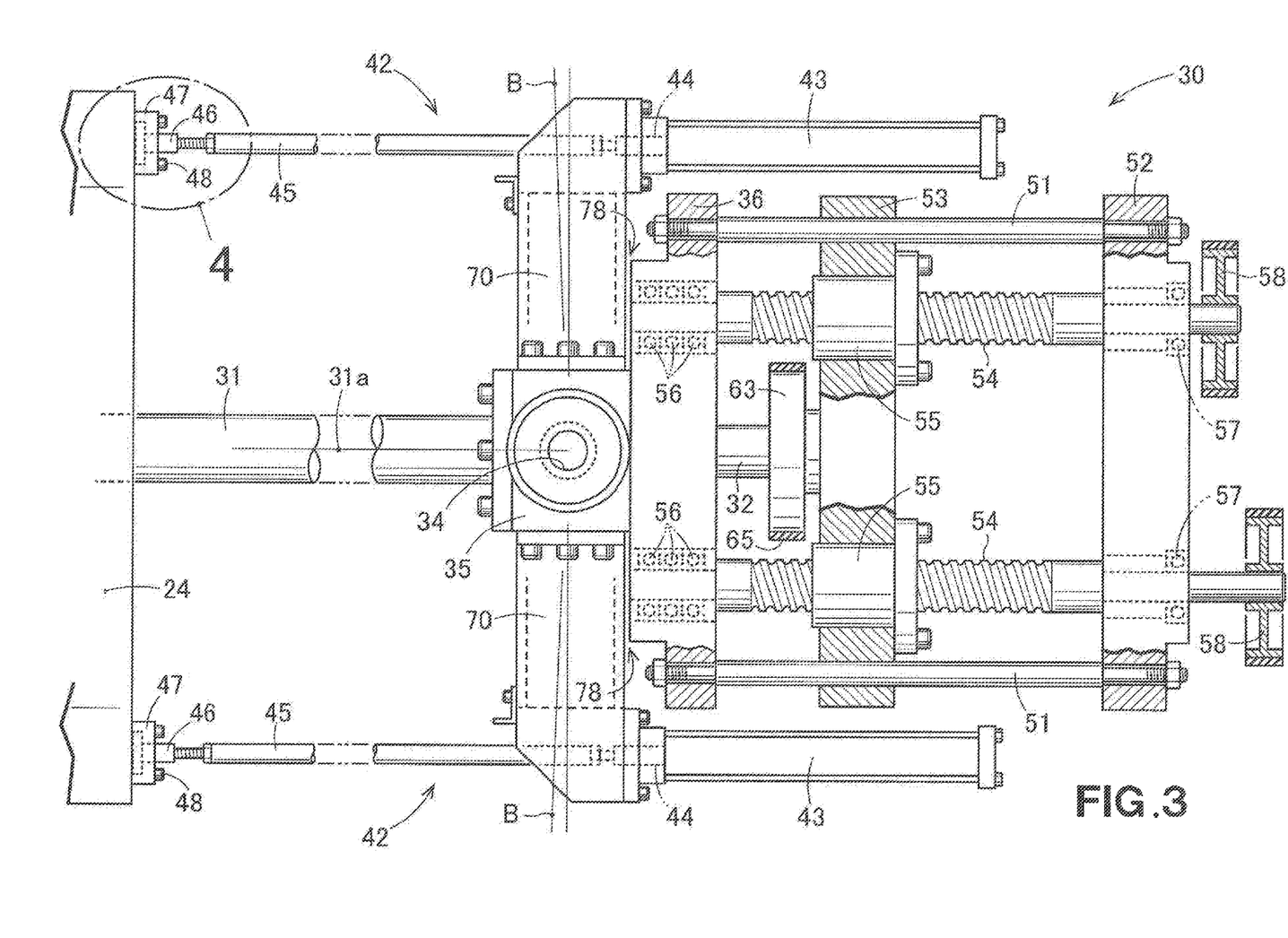
FIG. 3 is a diagram as viewed along an arrow 3 in FIG. 2, and is a plan view of the injection apparatus.

As illustrated in FIG. 3, a pair of supporting stages 70 is attached to the side faces of the drop-port block 35 which has the material drop-port 34. The supporting stage 70 extends in the direction orthogonal to a center axis (a lengthwise axis below) 31a of the heating cylinder 31 in the lengthwise direction.

Hydraulic cylinders 43 that are the primary components of the injection-apparatus moving mechanisms 42 are attached to the respective tip portions of the supporting stages 70.

That is, the pair of injection-apparatus moving mechanisms 42 is placed so as to be in parallel with the lengthwise axis 31a and at respective locations apart from the lengthwise axis 31a by a predetermined distance. It is preferable to symmetrically place the one injection-apparatus moving mechanism 42 and the other injection-apparatus moving mechanism 42 relative to the lengthwise axis 31a by making the two predetermined distances consistent with each other. Note that either one of the predetermined distances may be different if necessary due to, e.g., the easiness of installation.

A relay shaft 45 is threadably mounted on and coupled to a piston rod 44 of each hydraulic cylinder 43, a flanged bracket 46 is threadably mounted on and coupled to the tip of the relay shaft 45, and the flanged bracket 46 is connected (coupled) to the stationary mount 24 by a fixture bracket 47 and bolts 48.

That is, each injection-apparatus moving mechanism 42 includes the hydraulic cylinder 43 attached to the supporting stage 70, the relay shaft 45 which is coupled to the piston rod 44 of the hydraulic cylinder 43, and which extends toward the stationary mount 24, the flanged bracket 46 coupled to the tip of the relay shaft 45, and the fixture bracket 47 that fixes the flanged bracket 46 to the stationary mount 24 so as to be freely detachable.

The injection stage 36 that supports the drop-port block 35 is also extended in the direction orthogonal to the lengthwise axis 31a of the heating cylinder 31. However, the injection stage 36 and the supporting stage 70 are separated from each other, thus not connected to each other.

Such an injection stage 36 includes a plurality of (in this example, upper, lower, right and left, thus four) shafts 51 extended in the direction becoming apart from the heating cylinder 31, an injection actuating stage 52 which is connected to the respective tips of those shafts 51 and which is placed in parallel with the injection stage 36, the screw supporting plate 53 which is guided by the shafts 51 and which supports a screw 32 so as to be freely rotatable, a pair of threaded shafts 54 connected to the injection actuating stage 52 and to the injection stage 36 so as to pass completely through the screw supporting plate 53, and nuts 55 which are attached to the screw supporting plate 53 and which are engaged with the respective threads of the threaded shafts 54.

A ball screw with a small friction loss is suitable for the threaded shaft 54. The nut 55 is a ball nut in this case.

Bearings 56 are fitted in the injection stage 36, and respective ends of the threaded shafts 54 are inserted in the respective bearings 56.

Bearings 57 are fitted in the injection actuating stage 52, and the respective other ends of the threaded shafts 54 are inserted in the respective bearings 57. Respective pulleys 58 are fixed to the respective other ends of the threaded shafts 54.

When each pulley 58 is rotated by a screw forwarding and retracting motor (see FIG. 1, reference numeral 59) and a belt (see FIG. 1, reference numeral 61), each threaded shaft 54 is rotated. Since the nut 55 does not rotate, each nut 55 moves in the axial direction. When the threaded shaft 54 is rotated, the screw supporting plate 58 is forwarded or retracted. The movement of the screw supporting plate 53 causes the screw (see FIG. 1, reference numeral 32) to move forward or backward relative to the heating cylinder 31.

Moreover, the screw 32 illustrated in FIG. 1 is provided with a pulley 63, and the pulley 63 is rotated by a screw rotating motor 64 and by a belt 65.

Figure 4:
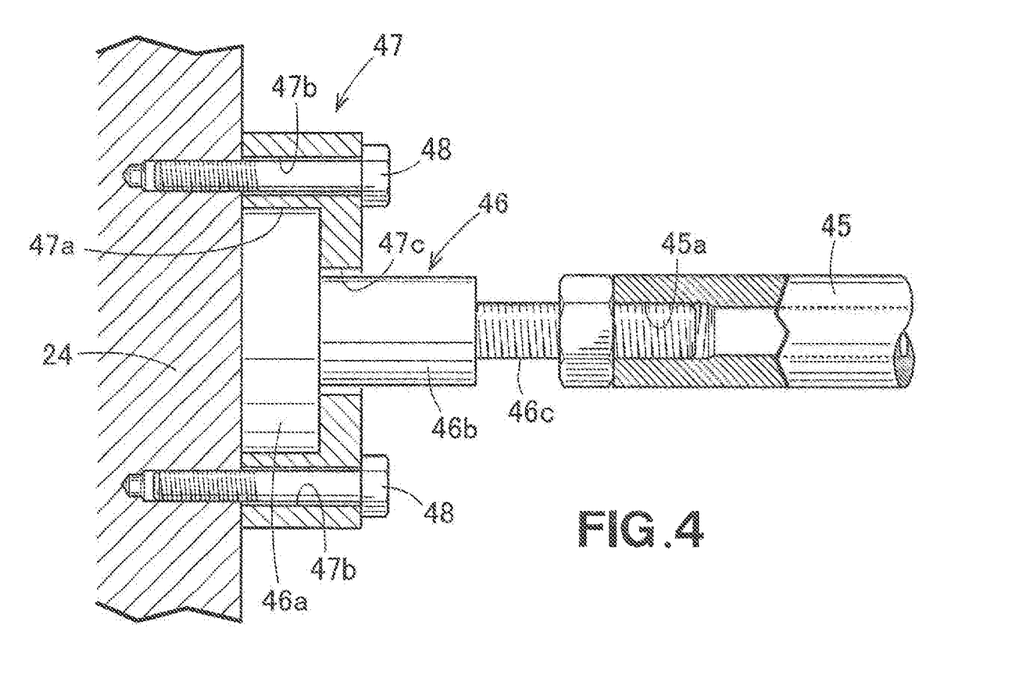
FIG. 4 is an enlarged cross-sectional view of a part 4 in FIG. 3.

As illustrated in FIG. 4, the flanged bracket 46 includes a flange 46a, a neck 46b extended from the flange 46a, and a screw portion 46c extended from the neck 46b.

The relay shaft 45 includes a female screw portion 45a at an end portion. The relay shaft 45 is desirably a hollow shaft. A hollow shaft is light-weighted in comparison with a solid shaft.

The fixture bracket 47 is a cup that includes a recess 47a in which the flange 46a is placed, bolt holes 47b provided at portions surrounding the recess 47a, and a through-hole 47c in connection with the recess 47a. Since the cup is thick, this bracket is heavy.

In FIG. 1, due to an inspection, etc., the injection apparatus 30 may be horizontally turned after being retracted. At the time of this turning, the relay shaft 45 illustrated in FIG. 2 may become an obstacle.

Figure 5:
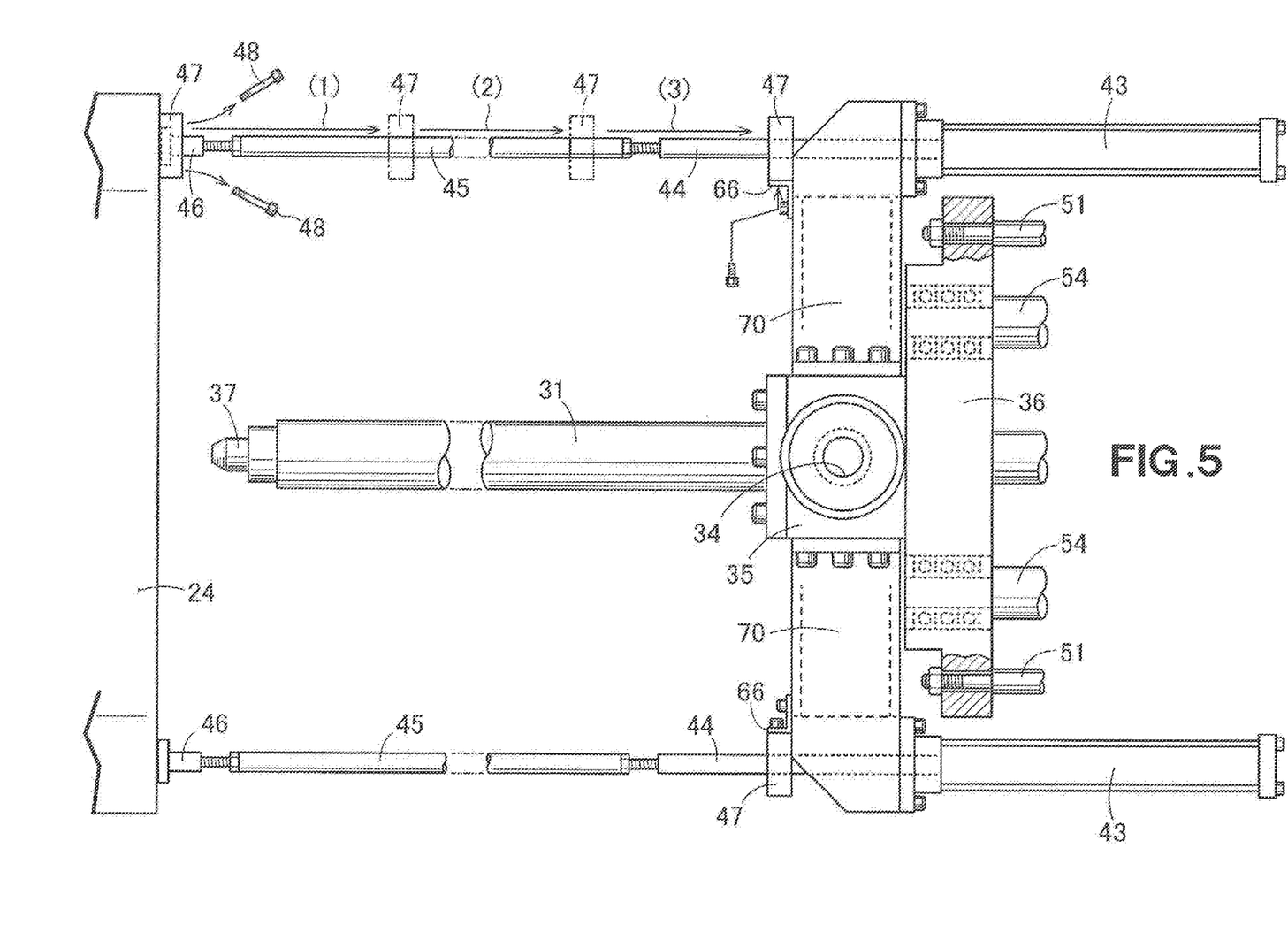
FIG. 5 is a diagram for describing a movement of a fixture bracket.

Accordingly, as illustrated in FIG. 5, the bolts 48 are removed, and the fixture bracket 47 is detached (removed) from the stationary mount 24. This enables the injection apparatus 30 to be horizontally turned. However, since the fixture bracket 47 is heavy, the distortion of the relay shaft 45 increases.

In order to address this problem, as indicated by arrows (1), (2), and (3), according to the present disclosure, the fixture bracket 47 is moved along the relay shaft 45, and the heavy fixture bracket 47 is tentatively caught (tentatively supported) by the supporting stage 70 using an appropriate attachment 66.

Hence, in FIG. 4, the through-hole 47c has a smaller diameter than the outer diameter of the flange 46a, but has a larger diameter than the respective outer diameters of the neck 46b and of the relay shaft 45. This enables the movement as indicated by the arrows (1), (2), and (3).

Note that an angle steel or a lightweight angle steel is preferable as the attachment 66, but the form thereof is optional. Moreover, the fixture bracket 47 may be tentatively caught directly by the supporting stage 70 without using the attachment 66.

With reference to FIGS. 6A to 6D, a structure of the supporting stage 70 will be described in detail.

Figure 6A:
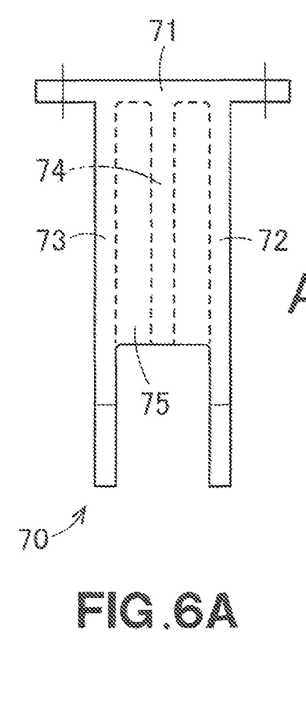
FIG. 6A is a diagram as viewed along an arrow A in FIG. 6B.

As illustrated in FIG. 6A, the supporting stage 70 includes a seat 71 to be in contact with the drop-port block (see FIG. 5, reference numeral 35), an upper wall 72 and a lower wall 73 extended from the seat 71, a reinforcement middle wall 74 placed between the lower wall 73 and the upper wall 72, and a front wall 75.

Figures 6B, 6C:
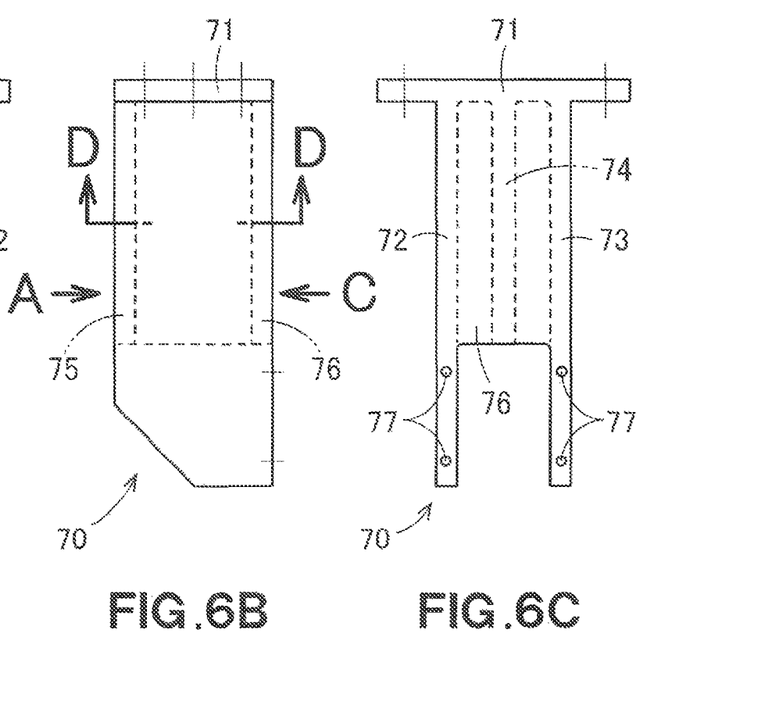
FIG. 6B is a plan view of a supporting stage.
FIG. 6C is a diagram as viewed along an arrow C in FIG. 6B.

As illustrated in FIG. GB, the supporting stage 70 further includes a back wall 76.

As illustrated in FIG. 6C, the upper wall 72 and the lower wall 73 are further elongated from the back wall 76, and female screw portions 77 in which bolts to fix the hydraulic cylinder (see FIG. 5, reference numeral 43) are engaged are formed in the respective elongated portions of the upper wall 72 and of the lower wall 73.

Figure 6D:
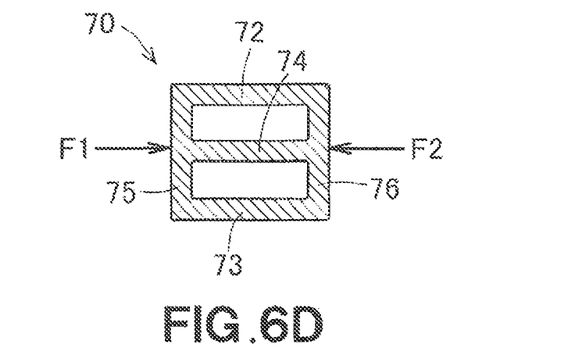
FIG. 6D is a cross-sectional view taken along a line D-D in FIG. 6B.

As illustrated in FIG. 6D, the supporting stage 70 is a rectangular cylindrical body that includes the upper wall 72, the lower wall 73, the front wall 75 that connects those walls 72 and 73, the back wall 76 that connects respective rear ends of the walls 72 and 73, and the reinforcement middle wall 74 which is in parallel with the upper wall 72 and the lower wall 73, and which connects the front wall 75 and the back wall 76. Such a stage is a cast component (including a cast steel component).

In the figure, reference numerals F1 and F2 indicate respective external forces. Since it is reinforced by the reinforcement middle wall 74, the supporting stage 70 has an excellent rigidity against the external forces F1 and F2. That is, the reinforcement middle wall 74 can enhance the rigidity in the external-fore applied direction.

Moreover, since it is a rectangular cylindrical body, in comparison with a solid body, weight-saving can be accomplished.

Note that the supporting stage 70 may be a welded structure body that has steel sheets welded together instead of a cast component.

Moreover, when the necessary durability is obtainable by the upper wall 72 and by the lower wall 73, the reinforcement middle wall 74 may be omitted. However, providing the reinforcement middle wall 74 enables a thinning of the upper wall 72 and of the lower wall 73. Accordingly, it is optional as appropriate whether or not to provide the reinforcement middle wall 74.

Actions of the injection apparatus 30 that employs the above-described structure will be described below.

In FIG. 3, when the hydraulic cylinder 43 takes a reducing action, predetermined nozzle-touch force is produced. Reaction force to this nozzle touch causes a distortion of the supporting stage 70 as indicated by lines B. Note that the lines B are exaggeratingly indicated for the purpose of illustration.

According to the present disclosure, there is a clearance 78 between the supporting stage 70 and the injection stage 36, and although the dimension of this clearance 78 may change, the injection stage 36 is not deformed.

Assuming that there is no supporting stage 70 and the hydraulic cylinder 43 is attached to the injection stage 36. In this case, the injection stage 36 is deformed. If the injection stage 36 is deformed, excessive load is applied to the bearing 56 and to the ball screw 54, giving an adverse effect to the lifetime of the bearing 56 and that of the ball screw 54.

In this point, according to the present disclosure, the injection stage 36 is not deformed because the supporting stage 70 is provided. Since the injection stage 36 is not deformed, a decrease in the lifetime of the bearing 56 and that of the ball screw 54 due to deformation is suppressed.

Moreover, the hydraulic cylinder 43 has the front portion (front end) fixed to the supporting stage 70, and has the remaining portion unfixed (free). When bending force is applied to the piston rod 44, the hydraulic cylinder 43 is inclined, and thus an adverse effect of bending is eased. The ease of the adverse effect extends the lifetime of the hydraulic cylinder 43.

Second Embodiment

Figure 7:
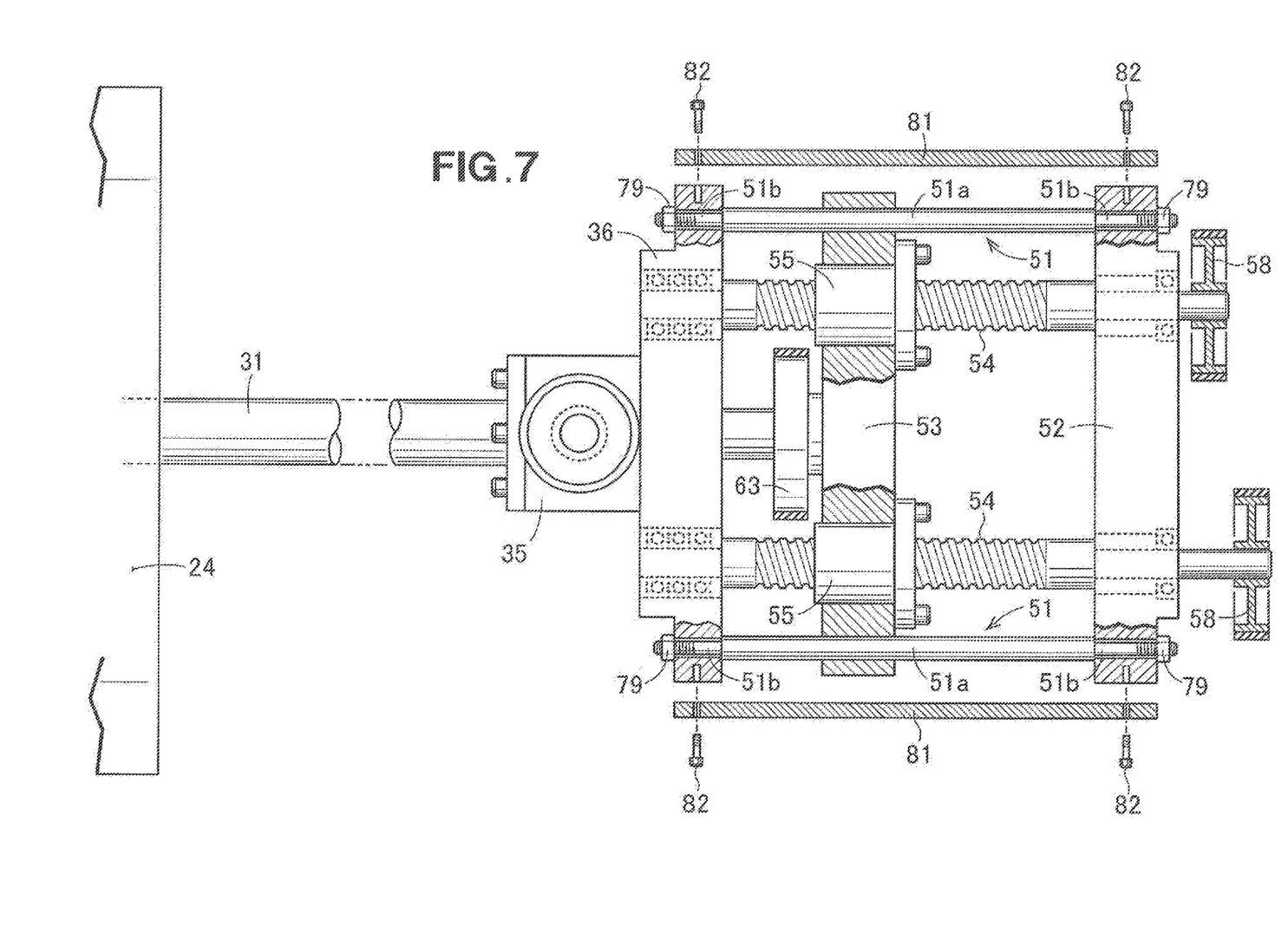
FIG. 7 is a diagram for describing an attachment procedure of a reinforcement frame.
Figure 8:
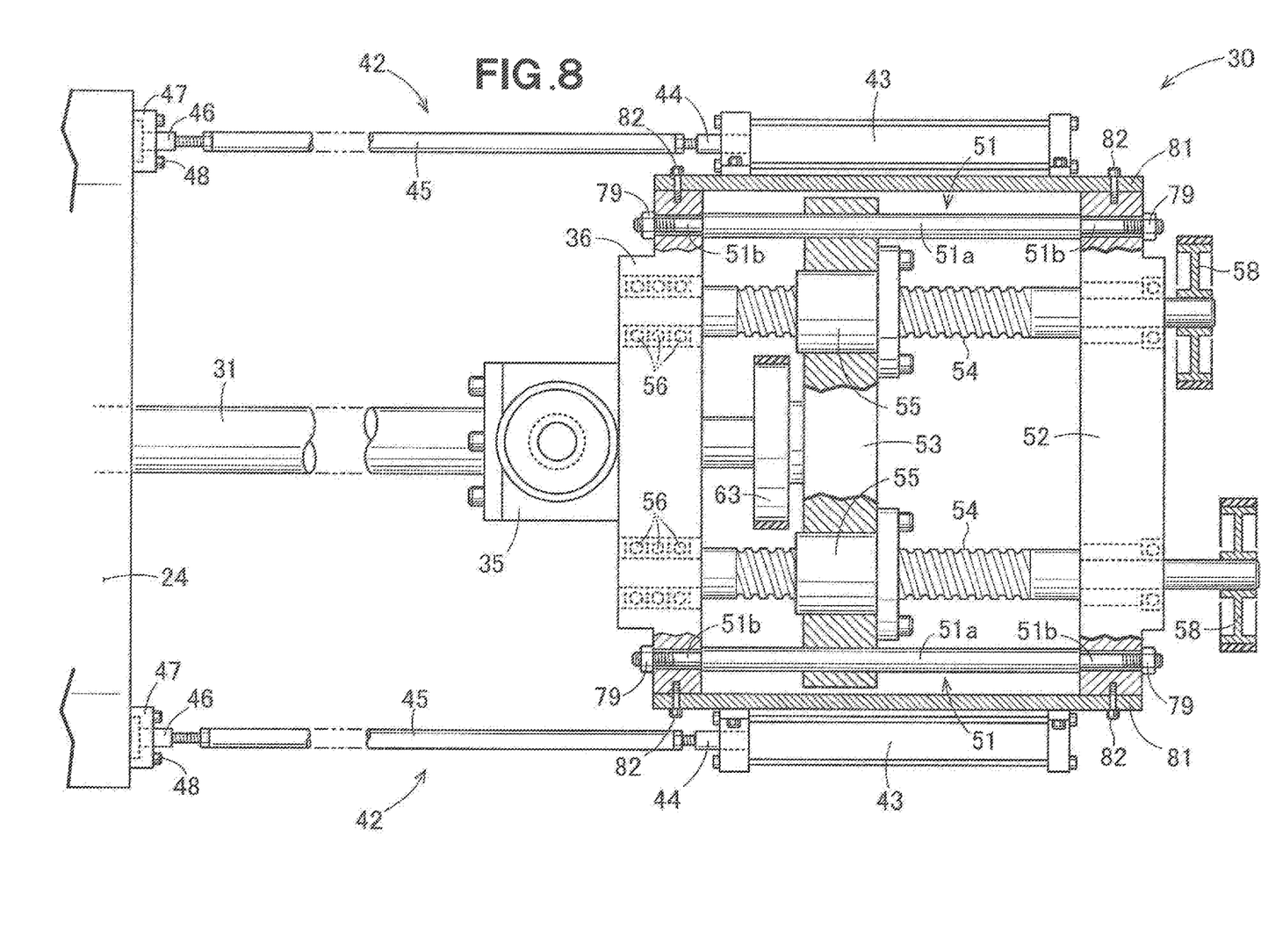
FIG. 8 is a plan view of an injection apparatus according to a second embodiment of the present disclosure.

With reference to FIGS. 7 and 8, an injection apparatus according to a second embodiment will be described.

As illustrated in FIG. 7, each shaft 51 includes a shaft main-body portion 51a and small-diameter portions 51b provided at both ends of the shaft main-body portion 51a, respectively. Each small-diameter portion 51b has a smaller diameter than that of the shaft main-body portion 51a. The shaft main-body portion 51a has a length precisely finished.

The one small-diameter portion 51b in the two small-diameter portions 51b is inserted through a hole in the injection stage 36, the other small-diameter portion 51b is inserted through a hole in the injection actuating stage 52, and respective nuts 79 are threadably engaged with respective ends of the small-diameter portions 51b.

Positioning of the injection stage 36 and of the injection actuating stage 52 is made at respective stepped portions that are boundaries between the shaft main-body portion 51a and the respective small-diameter portions 51b. As shown in FIGS. 7 and 8, the injection stage 36 and the injection actuating stage 52 abut the stepped portions.

That is, the stepped shafts 51 enable the injection actuating stage 52 to be precisely positioned with reference to the injection stage 36.

Next, reinforcement frames 81 are fixed to the positioned injection stage 36 and to the injection actuating stage 52 by bolts 82.

Since the injection actuating stage 52 is positioned relative to the injection stage 36 by the shafts 51, the reinforcement frames 81 can be simply attached, and this attachment work is easy.

Other structural components will be denoted by the same reference numerals in FIG. 3 and the detailed description thereof will be omitted.

Note that the reinforcement frame 81 may be formed in any shape, such as a channel cross-section or a T-shaped cross-section in addition to an I-shaped cross-section, all of which are one-piece structures.

According to the channel cross-section, since two flanges are elongated from both sides of a single web, respectively, a section modulus becomes larger than that of the I-shape cross-section, and thus the rigidity increases. Moreover, according to the T-shaped cross-section, since a single flange is elongated from the center of a single web, a section modulus becomes larger than that of the I-shaped cross-section, and thus the rigidity increases.

In the cases of the channel cross-section and of the T-shaped cross-section, a web is placed at the screw-supporting-plate-53 side, and the flange is elongated outwardly, thereby avoiding an interference with the screw supporting plate 53.

As illustrated in FIG. 8, the hydraulic cylinder 43 as the injection-apparatus moving mechanism 42 is attached to each reinforcement frame 81.

The injection stage 36 and the injection actuating stage 52 are coupled by the reinforcement frames 81 in addition to the shafts 51, thus becoming a rectangular rigid frame structure as a whole.

When reaction force against the nozzle touch acts on the injection stage 36, since the end portions of the injection stage 36 are supported by the shafts 51, the reinforcement frames 81, the injection actuating stage 52, and the end portions of the injection stage 36 are not displaced. Even if a displacement occurs, it is quite little that is ignorable.

Consequently, a deformation that gives an adverse effect to the bearings 56 does not occur on the injection stage 36.

According to this example, although the front portion and rear portion of each hydraulic cylinder 43 are fixed to each reinforcement frame 81, regarding the hydraulic cylinder 43, only the front portion may be fixed to the reinforcement frame 81, or only the center portion may be fixed to the reinforcement frame 81.

When, however, the front portion and rear portion of each hydraulic cylinder 43 are fixed to each reinforcement frame 81, the hydraulic cylinder 43 accomplishes a role to reinforce the reinforcement frame 81, and thus the bending rigidity of the reinforcement frame 81 further increases. Accordingly, it is recommended to fix the front portion and rear portion of the cylinder 43 to the reinforcement frame 81.

Third Embodiment

An injection apparatus according to a third embodiment will be described with reference to FIG. 9.

Figure 9:
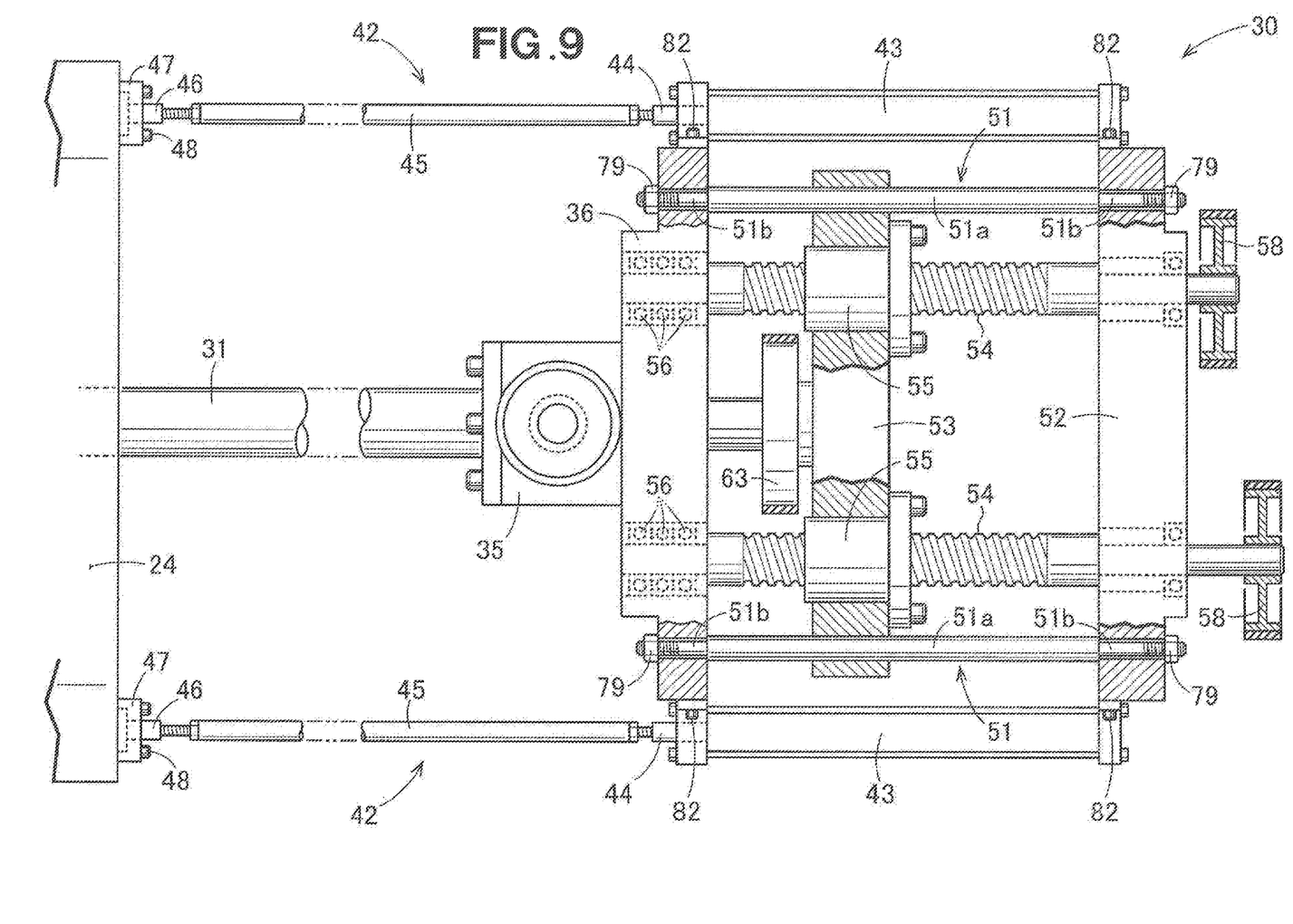
FIG. 9 is a plan view of an injection apparatus according to a third embodiment of the present disclosure.

As illustrated in FIG. 9, the hydraulic cylinders 43 as the respective injection-apparatus moving mechanisms 42 are fixed to, by bolts 82, the injection stage 36 and to the injection actuating stage 52 both positioned by the shafts 51.

Each hydraulic cylinder 43 includes a main structural component that is a thick steel cylinder capable of withstanding high pressure.

The injection stage 36 and the injection actuating stage 52 are coupled to the rigid injection-apparatus moving mechanisms 42 (the hydraulic cylinders 43) in addition to the shafts 51, and becomes a rigid rectangular frame structure as a whole. Consequently, a deformation of the injection stage 36 is suppressed, and thus a deformation that gives an adverse effect to the bearings 56 does not occur.

Note that in FIG. 3, the heating cylinder 31 may be attached to the drop-port block 35 by means of bolts, but the drop-port block 35 may be integrated with the heating cylinder 31 or with the injection stage 36.

Moreover, the hydraulic cylinder 43 that is a primary component of the injection-apparatus moving mechanism 42 may be a motor-actuated cylinder, a pneumatic cylinder, or a rack-and-pinion mechanism that has an electric motor as an actuation source.

The present disclosure is suitable for an injection apparatus installed so as to correspond to a mold clamping apparatus.

What is claimed is:

1. An injection apparatus installed adjacent to a mold clamping apparatus,
wherein the mold clamping apparatus comprises:
a stationary mount; and a stationary mold attached to the stationary mount, and
wherein the injection apparatus comprises:
a heating cylinder having at a front end thereof a nozzle for injecting resin material into the stationary mold;
a screw retained in the heating cylinder so as to be freely rotatable and movable in an axial direction;
a drop-port block supporting the heating cylinder, the drop-port block having a material drop-port provided at a base portion of the heating cylinder for dropping resin material into the heating cylinder;
an injection stage which extends orthogonal to a lengthwise axis of the heating cylinder and which supports the drop-port block;
a supporting stage connected to the drop-port block and extending outward from opposite sides of the drop-port block in a direction orthogonal to the lengthwise direction; and
a pair of injection-apparatus moving mechanisms that moves the heating cylinder so as to bring the nozzle into contact with the stationary mold, the pair of injection-apparatus moving mechanisms being connected to respective outer end portions of the supporting stage and to the stationary mount,
wherein the supporting stage extends alongside the injection stage with a clearance therebetween so that any deformation of the supporting stage caused by pressing the nozzle into contact with the stationary mold is not transmitted to the injection stage.

2. The injection apparatus according to claim 1, wherein:
the supporting stage comprises two rectangular cylindrical structures; and
each rectangular cylindrical structure comprises: a seat connected to the drop-port block; and an upper wall, a lower wall, a front wall, and a back wall which extend lengthwise from the seat in a direction orthogonal to the lengthwise axis.

3. The injection apparatus according to claim 2, wherein each supporting stage further comprises a reinforcement middle wall which is parallel to the upper wall, and which interconnects the front wall and the back wall.

4. The injection apparatus according to claim 1, wherein each injection apparatus moving mechanism comprises:
a hydraulic cylinder attached to the supporting stage;
a relay shaft connected to a piston rod of the hydraulic cylinder and extended toward the stationary mount;
a flanged bracket which is coupled to a tip of the relay shaft and which comprises a flange that has a larger outer diameter than an outer diameter of the relay shaft; and
a fixture bracket that detachably fixes the flanged bracket to the stationary mount.

5. The injection apparatus according to claim 4, wherein the hydraulic cylinder has a front portion fixed to the outer end portion of the supporting stage, the remaining portion of the hydraulic cylinder being unfixed.

6. The injection apparatus according to claim 4, wherein the fixture bracket has a through-hole having a diameter which is larger than the outer diameter of the relay shaft, and which is smaller than the outer diameter of the flange, thereby enabling detachment of the fixture bracket from the stationary mount and displacement of the fixture bracket along the relay shaft to a location adjacent the supporting stage.

7. An injection apparatus installed adjacent to a mold clamping apparatus,
wherein the mold clamping apparatus comprises:
a stationary mount; and a stationary mold attached to the stationary mount, and
wherein the injection apparatus comprises:
a heating cylinder having at a front end thereof a nozzle for injecting resin material into the stationary mold;
a screw retained in the heating cylinder so as to be freely rotatable and movable in an axial direction;
an injection stage which extends orthogonal to a lengthwise axis of the heating cylinder and which supports the heating cylinder, the injection stage comprising an injection actuating stage which actuates the injection stage and which extends orthogonal to the lengthwise axis, plural shafts extending parallel to the lengthwise axis and interconnecting the injection stage and the injection actuating stage, and two spaced-apart reinforcement frames which are separate from the plural shafts and which extend lengthwise parallel to the lengthwise axis and are connected at opposite ends, respectively, to the injection stage and the injection actuating stage; and
two injection-apparatus moving mechanisms mounted on respective reinforcement frames and connected to the stationary mount for moving the heating cylinder to bring the nozzle into contact with the stationary mold.

8. The injection apparatus according to claim 7, wherein each injection-apparatus moving mechanism comprises a hydraulic cylinder that has a front portion coupled to the stationary mount and a rear portion fixed to the reinforcement frame.

9. The injection apparatus according to claim 7,
wherein each of the plural shafts has a shaft main-body portion, and small-diameter portions which are provided at both ends of the shaft main-body portion, respectively, and which have a smaller diameter than a diameter of the shaft main body portion, and
wherein one of the small-diameter portions of each shaft is inserted through an opening in the injection stage and the other of the small-diameter portions of each shaft is inserted through an opening in the injection actuating stage so that opposite ends of the shaft main-body portions abut the injection stage and the injection actuating stage, respectively.

10. The injection apparatus according to claim 7, wherein each reinforcement frame comprises a one-piece frame.

11. An injection apparatus installed adjacent to a mold clamping apparatus, wherein the mold clamping apparatus comprises:
a stationary mount; and a stationary mold attached to the stationary mount,
wherein the injection apparatus comprises:
a heating cylinder having at a front end thereof a nozzle for injecting resin material into the stationary mold;
a screw retained in the heating cylinder so as to be freely rotatable and movable in an axial direction;
an injection stage which extends orthogonal to a lengthwise axis of the heating cylinder and which supports the heating cylinder, the injection stage comprising a screw supporting plate rotatably supporting a rear end portion of the screw, an injection actuating stage which extends orthogonal to the lengthwise axis and which moves the screw supporting plate along the lengthwise axis to thereby move the screw in the axial direction, the screw supporting plate being disposed between the injection stage and the injection actuating stage, and a plurality of shafts extending parallel to the lengthwise axis and interconnecting the injection stage and the injection actuating stage, the screw supporting plate being slidable along the shafts; and
a pair of injection-apparatus moving mechanisms connected to the injection stage and to the injection actuating stage for moving the heating cylinder to bring the nozzle into contact with the stationary mold.

12. The injection apparatus according to claim 11, further including a rotary motor supported by the screw supporting plate and connected to rotationally drive the screw.

13. The injection apparatus according to claim 12, wherein the injection actuating stage includes two threaded shafts which are rotatably supported at opposite ends by the injection stage and the injection actuating stage and which pass completely through the screw supporting plate, and two nuts fixed in openings in the screw supporting plate and threadedly engaged with respective ones of the threaded shafts so that rotation of the threaded shafts moves the screw supporting plate along the shafts.

14. The injection apparatus according to claim 13, wherein the injection actuating stage includes a second rotary motor connected to rotationally drive the two threaded shafts.

15. The injection apparatus according to claim 14, wherein the second rotary motor is connected through a pulley and belt system to the two threaded shafts.

* * * * *